US 7,822,850 B1

(12) United States Patent
Brikman et al.

(10) Patent No.: US 7,822,850 B1
(45) Date of Patent: Oct. 26, 2010

(54) ANALYZING LOG FILES

(75) Inventors: Yevgeniy Brikman, Cambridge, MA (US); Manish Shah, Waltham, MA (US); Paul Antinori, Harvard, MA (US); Harun Gadatia, Boxborough, MA (US); Vipin Palawat, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 364 days.

(21) Appl. No.: 12/013,146

(22) Filed: Jan. 11, 2008

(51) Int. Cl.
*G06F 15/173* (2006.01)

(52) U.S. Cl. .............. 709/224; 709/223; 707/999.102

(58) Field of Classification Search .......... 709/224, 709/223; 707/3, 100, 102, 999.03, 999.1, 707/999.102
See application file for complete search history.

(56) References Cited

U.S. PATENT DOCUMENTS

| 6,317,787 | B1 * | 11/2001 | Boyd et al. ............. 709/224 |
| 7,483,910 | B2 * | 1/2009 | Beyer et al. ............ 707/102 |
| 2004/0254919 | A1 * | 12/2004 | Giuseppini ............. 707/3 |
| 2006/0085788 | A1 * | 4/2006 | Amir et al. ............ 718/100 |
| 2007/0204215 | A1 * | 8/2007 | Mueller et al. ......... 707/102 |
| 2007/0239799 | A1 * | 10/2007 | Modi ................... 707/202 |

OTHER PUBLICATIONS

Java Expression Language (JEXL); http://commons.apache.org/jexl/index.html; printed Jan. 10, 2008.
Jr Auburn et al., State Chart XML (SCXML): State Machine Notation for Control Abstraction 1.0; http://www.w3.org/TR/2005/WD-scxml-20050705/; printed Jan. 10, 2008.
"Compiler-Compiler;" http://en.wikipedia.org/wiki/Parser_generator; printed Jan. 11, 2008.

* cited by examiner

*Primary Examiner*—Philip B Tran
(74) *Attorney, Agent, or Firm*—Tucker Ellis & West LLP

(57) ABSTRACT

Described in an example embodiment herein is a method for extracting values from a plurality of data fields from a log file using a grammar file. The plurality of data fields and a procedure for extracting values from the plurality of data fields are defined in the grammar file. Extracted values are analyzed and graphically represented.

18 Claims, 13 Drawing Sheets

Figure 12

Call Flow

Call Flow

ANALYZING LOG FILES

TECHNICAL FIELD

The present disclosure relates to analyzing files, particularly to analyzing log files.

BACKGROUND

A software application may create a log file to track activity and progress of the application and to report errors occurring during execution of the application. For example, a log file may contain information relating to an email software application. The log file may contain both successful and unsuccessful attempts made by the email application to send an email message. It may be useful for a systems administrator to efficiently access the information in a log file when analyzing the execution of a software application or when troubleshooting a software application. Log files may contain large amounts of information, for example thousands of lines of text. Often it is hard to find data. As a result, reading through a log file manually may be inefficient. Additionally, a log file may contain large amounts of irrelevant information. Thus, locating desired information in a log file may be difficult. A log file reader may be useful for reading a log file however the log file reader may only be compatible with a particular log file format. Creating a multiple log file readers using C++, Java, or Pearl for example, to be compatible with multiple log file formats may be time consuming and difficult to maintain.

BRIEF DESCRIPTION OF THE DRAWINGS

The accompanying drawings incorporated herein and forming a part of the specification illustrate the examples embodiments.

FIG. 12 illustrates an example screen enabling a user to filter results of a log file analysis.

OVERVIEW OF EXAMPLE EMBODIMENTS

Figure 1:
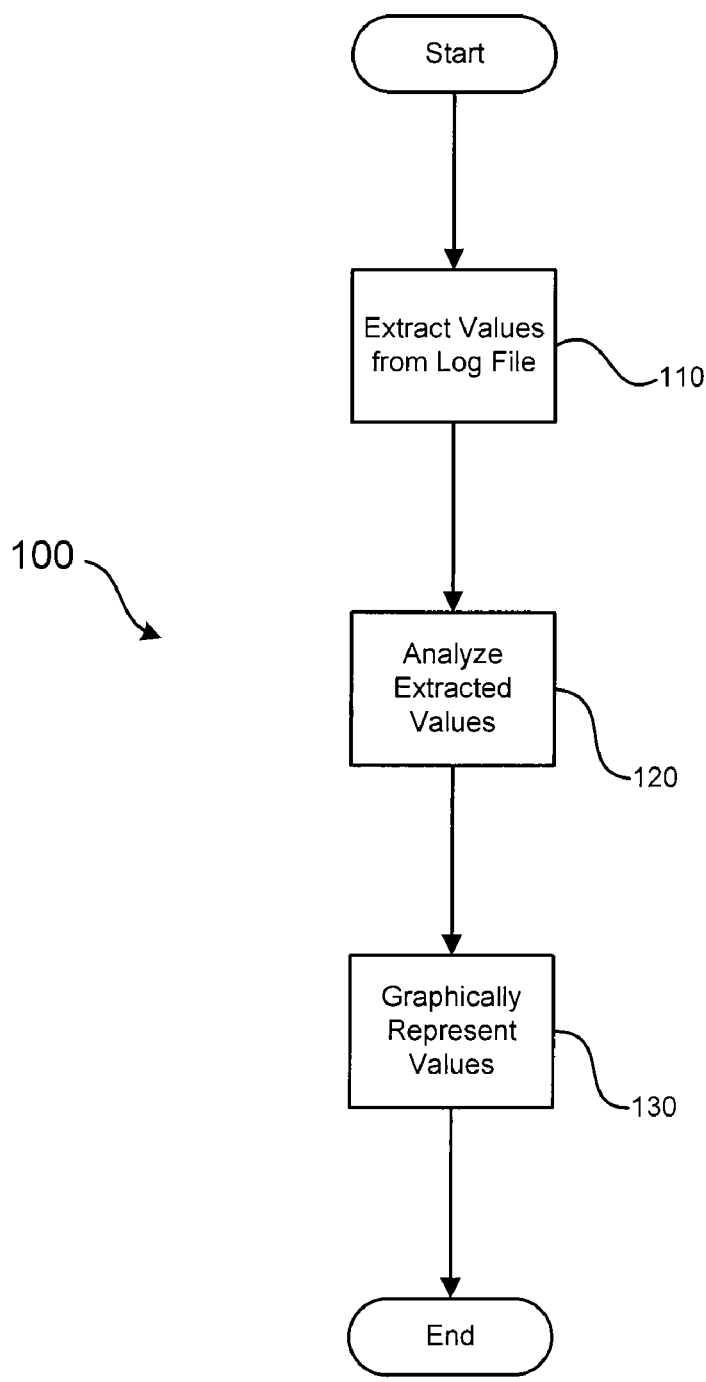
FIG. 1 is a block diagram of an example method in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein a method comprising extracting values from a plurality of data fields from a log file using a grammar file. The plurality of data fields and a procedure for extracting values from the plurality of data fields are defined in the grammar file. The method also comprises analyzing the extracted values and graphically representing the extracted values.

In accordance with an example embodiment, there is disclosed herein an apparatus comprising an extraction module to extract values of a plurality of data fields from a log file using a grammar file. The plurality of data fields and a procedure for extracting the values of the plurality of data fields are defined in the grammar file. The apparatus also comprises an analyzing module to generate an analysis of the extracted values. The apparatus also comprises a graphing module to generate a graphical representation of the extracted values.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements.

In accordance with an example embodiment, described herein is a method and apparatus for extracting, analyzing and graphically representing information in a log file. The method and apparatus are not limited to a specific log file format.

In an example embodiment, there is described herein an example embodiment for using the log file analyzer disclosed herein as a Call Flow Tool (CFT) that is designed as a generic way to parse almost any log file, search and filter the results, visualize the call flow, and analyze the data.

The CFT contains a generic parser that does not have hard coded grammar. Instead, to parse a log file of a particular format, the parser is provided with a grammar file describing the log file.

Grammars can be defined in an XML file using a Log Description Language (LDL).

The LDL format defines what fields are in the log file and details how to extract values for these fields. Depending on these definitions, all found data is stored in one or more GenericMessage objects that contain (field, value) pairs.

The CFT allows the user to search log file for particular (field, value) pairs. Moreover, the results can be further filtered by excluding particular groups of (field, value) pairs.

In instances where the GenericMessage objects contain information that describes a message exchange—that is, there is a "sender" and "receiver" defined—the CFT can visualize this exchange in the form of a ladder diagram. The ladder diagram allows a user to instantly visualize the call flow within the log file.

In order to support analysis of this data, the CFT can pass the parsed GenericMessage objects through a finite state machine provided by the user. The finite state machine can be defined in State Chart XML (SCXML) format, as defined in this W3C working draft.

SCXML allows a user to define states and transitions between them. Since transitions are typically fired by events, the user must also define how to convert GenericMessage objects to events. This is done using an Event Definition Language (EDL) in an XML file. The EDL allows a user to define an event depending on the (field, value) pairs within each GenericMessage object using the Java Expression Language.

For example, the CFT can be employed to analyze telephone calls using the Session Initiation Protocol (SIP) to set up phone calls. The exchange of SIP messages are written to a log file. In order to analyze these log files, an XML template (using LDL) can be created that describes SIP.

The CFT can then use this template to parse the log file and extract all the SIP messages The CFT can Search and filter the results for specific (field, value) pairs, such as finding all messages with some particular call id. The CFT can visualize the call flow as a ladder diagram. In addition (or optionally), the CFT can pass the SIP messages—grouped by call id—through a finite state machine that was defined using SCXML. For example, the state machine can provide statistics about the number (or percent) of calls ended in a "success" state, and the number of calls (or percent) that ended in an "error" state and so on.

Although the example just set forth is for SIP, the same features are available for virtually any logging protocol. For example, templates can be created for a number of products/protocols, including but not limited to Session Initiation Protocol (SIP) log files, Interactive Voice Response (IVR) log files, Intelligent Contact Management (ICM) log files, and H.323 log files.

FIG. 1 illustrates an example method 100 in accordance with an example embodiment. At 110 values are extracted (parsed) from a log file. The values may be extracted from a plurality of data fields from a log file using a grammar file. The grammar file may define the data fields of the log file and a procedure for extracting the values of the data fields. For example, a log file may track the execution times of a process. The log file may contain values including a process name, an execution start time, and an execution end time separated by commas. A grammar file may define how to extract or translate data from the process name data field, start time data field, and an end time data field name from the log file.

In an example embodiment, the grammar file may be created using an Extensible Markup Language (XML) template. The plurality of data fields and the procedure for extracting the values of the plurality of data fields may be defined using a Log Description Language (LDL). For example, an XML file may be defined with a root element MessageType tag. Data fields may be defined using a Field tag. A FirstLines tag may be used to identify the first line of the relevant information in the log file. A Line tag may define a line in the log file. A Literal tag and a PXML tag may define how to extract values from a line define by the Line tag.

At 120, the extracted values are analyzed. Analyzing extracted values may include, for example, sorting, tabulating, or converting, etc. The analysis can be limited to a specific device such as a server in a telephone call setup. The analysis can be performed by using a predefined state machine. The state machine can be created using SCXML. The state machine allows a user to define states and transitions between them. Transitions are typically triggered by events, so the state machine should include data for defining how to convert message objects into events.

At 130, the extracted, analyzed values are graphically displayed. A graphical representation of extracted values may include, for example, a bar graph, a pie chart, or text, etc. For example, a CFT may display call data in the form of a ladder diagram.

Figure 2:
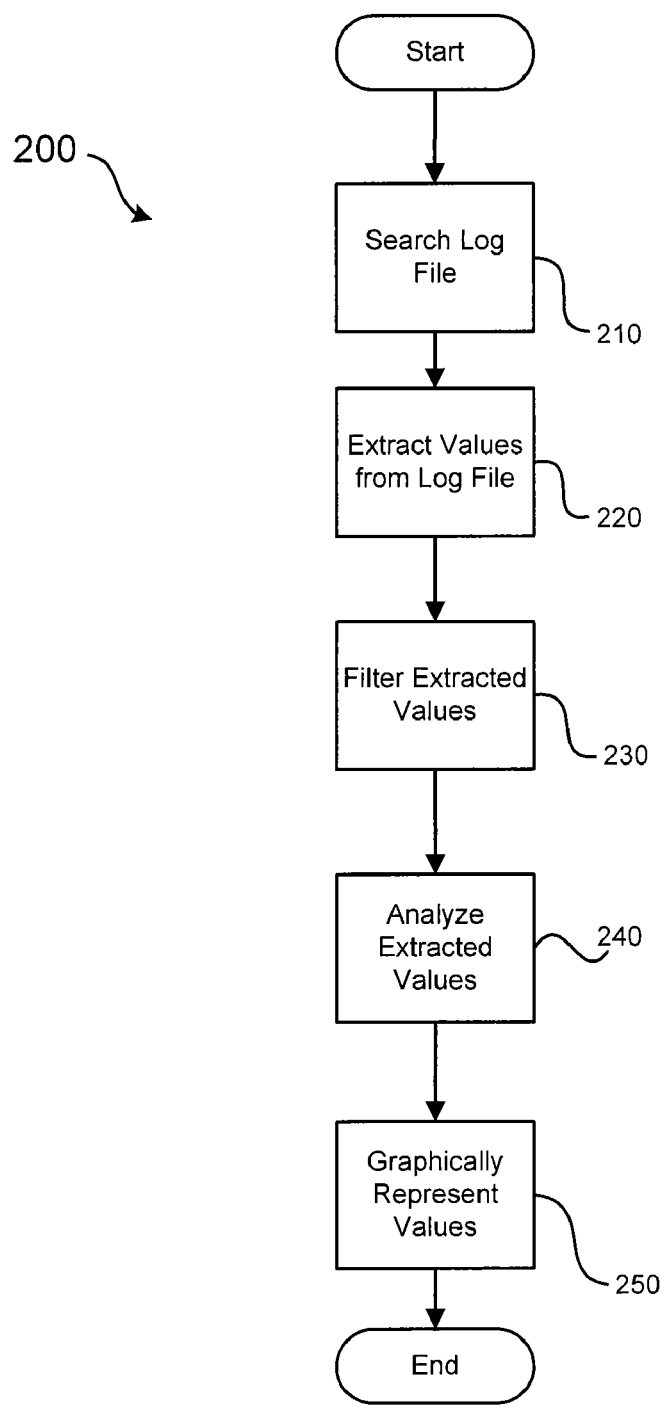
FIG. 2 is a block diagram of an example method in accordance with an example embodiment.

FIG. 2 illustrates an example method 200 in accordance with an example embodiment. Method 200 enables the log file to be searched for specific data.

At 210, a log file is searched. It should be noted that more than one log file can be searched; the example described herein uses one log file merely for ease of illustration.

In an example embodiment, a grammar file defines a data field as capable of being searched. The grammar file may also define a procedure for extracting a value, based on a user specified search parameter, from the data field defined as capable of being searched. Search options may be made available to a user based on a definition in a grammar file. For example, a grammar file may define data fields A, B and C of a log file. The grammar file may define data field A as capable of being searched. Using the grammar file, a user may be given an option to search the log file for values of data field A that match a user specified search parameter.

At 220 values are extracted from the log file. The values extracted may be limited to the values returned by the search of the log file at 210 based on a user specified search parameter. Alternatively, all values in a log file may be extracted. The values may be extracted from a plurality of data fields from a log file using a grammar file. The grammar file may define the data fields of the log file and a procedure for extracting the values of the data fields. For example, a log file may track the execution times of a process. The log file may contain values including a process name, an execution start time, and an execution end time separated by commas. A grammar file may define how to extract or translate data from the process name data field, start time data field, and an end time data field name from the log file.

At 230, the extracted values are filtered. The extracted values may be filtered based on a user specified filter parameter.

In an example embodiment, extracted values may be analyzed using a finite state machine (FSM). A FSM models the behavior of an object or a system. Modeling the system may be useful in order to better understand the object or system. For example, it may not be initially clear as to why a particular object acts in a certain manner. However, by analyzing the behavior of the object using a FSM, it may become clear that the object consistently acts in a certain manner in response to a specific condition.

At 240, the extracted, filtered values are analyzed. Analyzing the extracted, filtered values may include, for example, sorting, tabulating, or converting, etc. The analysis can be limited to a specific device such as a server in a telephone call setup. The analysis can be performed by using a predefined state machine. The state machine can be created using SCXML. The state machine allows a user to define states and transitions between them. Transitions are typically triggered by events, so the state machine should include data for defining how to convert message objects into events.

At 250, the extracted, analyzed values are graphically displayed. A graphical representation of extracted values may include, for example, a bar graph, a pie chart, or text, etc. For example, a CFT may display call data in the form of a ladder diagram.

Figure 3:
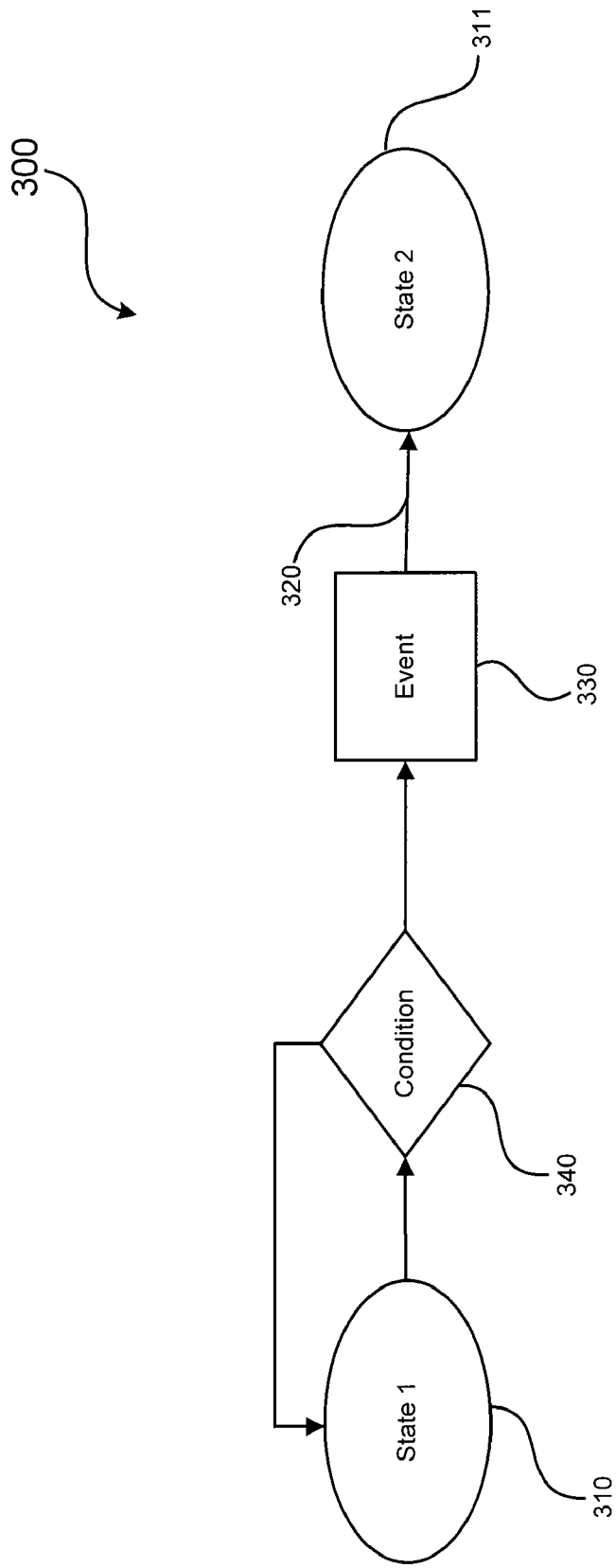
FIG. 3 is an example finite state machine.

FIG. 3 illustrates an example FSM 300. FSM 300 comprises a plurality of states 310 and 311. A state defines status at a given time. For example, a light may be in an off state. In another example, a light may be in an on state. FSM 300 comprises a transition 320 to indicate a change of states. For example, a transition may occur when a light moves to an on state from an off state. FSM 300 comprises an event 330 to trigger a transition. For example, an electrical current being supplied to a light may be an event 330 triggering the transition 320 of the light from an off state to an on state. FSM comprises a condition 340 to determine the occurrence of an event 330. If the condition 340 does not evaluate to true, the state will remain unchanged. However if the condition 340 does evaluate to true, an event 330 will occur, triggering a transition 320 in states. For example, whether a button is pushed may be a condition. If the button is not pushed, the light will remain in the off state. However, when the button is pushed, an electric current will be sent to the light bulb triggering a change of state to the on state.

A FSM may be defined in State Chart Extensible Markup Language (SCXML). SCXML is a standard defined by the World Wide Web Consortium. A FSM defined in SCXML may be executed by a Jakarta Commons SCXML engine. A FSM event may be defined in Event Definition Language (EDL). A FSM condition may be defined in Java Expression Language (JEXL).

In an example embodiment, analyzing values extracted from a log file using a finite state machine may include inputting the extracted values to the finite state machine. Results may be obtained from the finite state machine including an initial state, a final state, and an event triggering a transition between the initial state and the final state. Results may be presented. In one example, result may be presented graphically in a pie chart, bar graph, ladder diagram and/or in text, etc.

In an example embodiment, a log file may contain information corresponding to a communication between a first component and a second component. The communication may include a plurality of message exchanges between the first component and the second component. Values of a plurality of data fields of a log file may correspond to the plurality of message exchanges. For example, a personal computer connected to a local area network may periodically send a message to a server to verify connectivity to the local area network. The computer may then wait for a response from the server. A lack of a response within a specified time period may indicate a problem with the local area network connection. A log file may track messages sent and received or not received by the personal computer.

Figure 4:
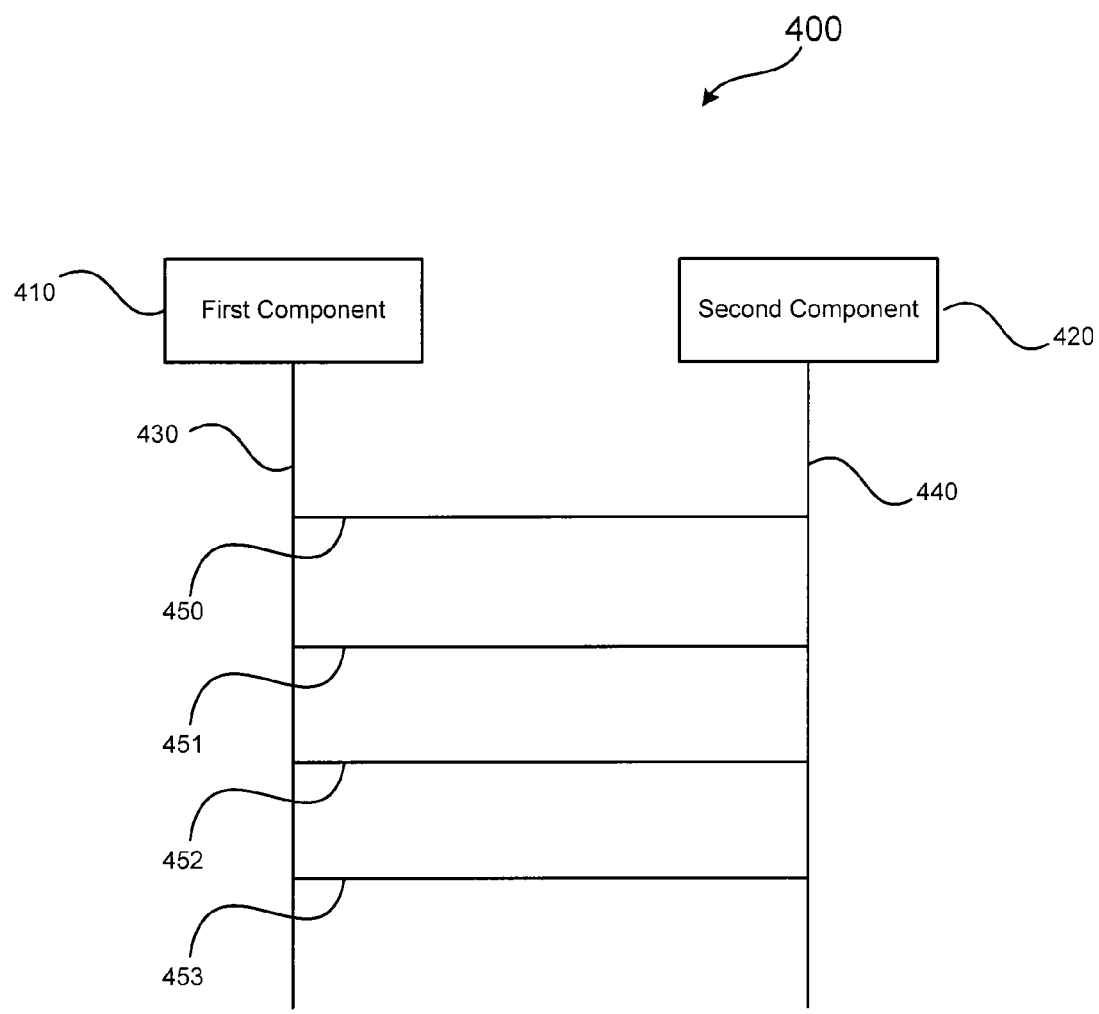
FIG. 4 is an example ladder diagram.

In one example, a graphical representation of values extracted from data fields of a log file may be a ladder diagram corresponding to a communication between a first component and a second component. FIG. 4 illustrates an example ladder diagram 400. Ladder diagram 400 comprises a first vertical ladder member 430 corresponding to a first component 410. Ladder diagram 400 comprises a second vertical ladder member 440 corresponding to a second component 420. Ladder diagram 400 also comprises a plurality of ladder rungs 450, 451, 452, and 453 extending from the first ladder member 430 to the second ladder member 440. The plurality of ladder rungs corresponds to a plurality of message exchanges between the first component and the second component.

In one example, a ladder diagram may be exported for use in presentations, reports, and documents, etc. In one example, a plurality of ladder rungs of a ladder diagram may be represented in a plurality of colors corresponding to a plurality of message groups. In one example, a plurality of ladder rungs may be represented in a plurality of styles corresponding to a plurality of message types. In the previous example describing a personal computer communicating with a server, each pair of outgoing message and incoming response may be considered a separate group. Additionally, an outgoing message sent by a personal computer may be represented by a solid line whereas the response received from the server may be represented dashed line.

Figure 5:
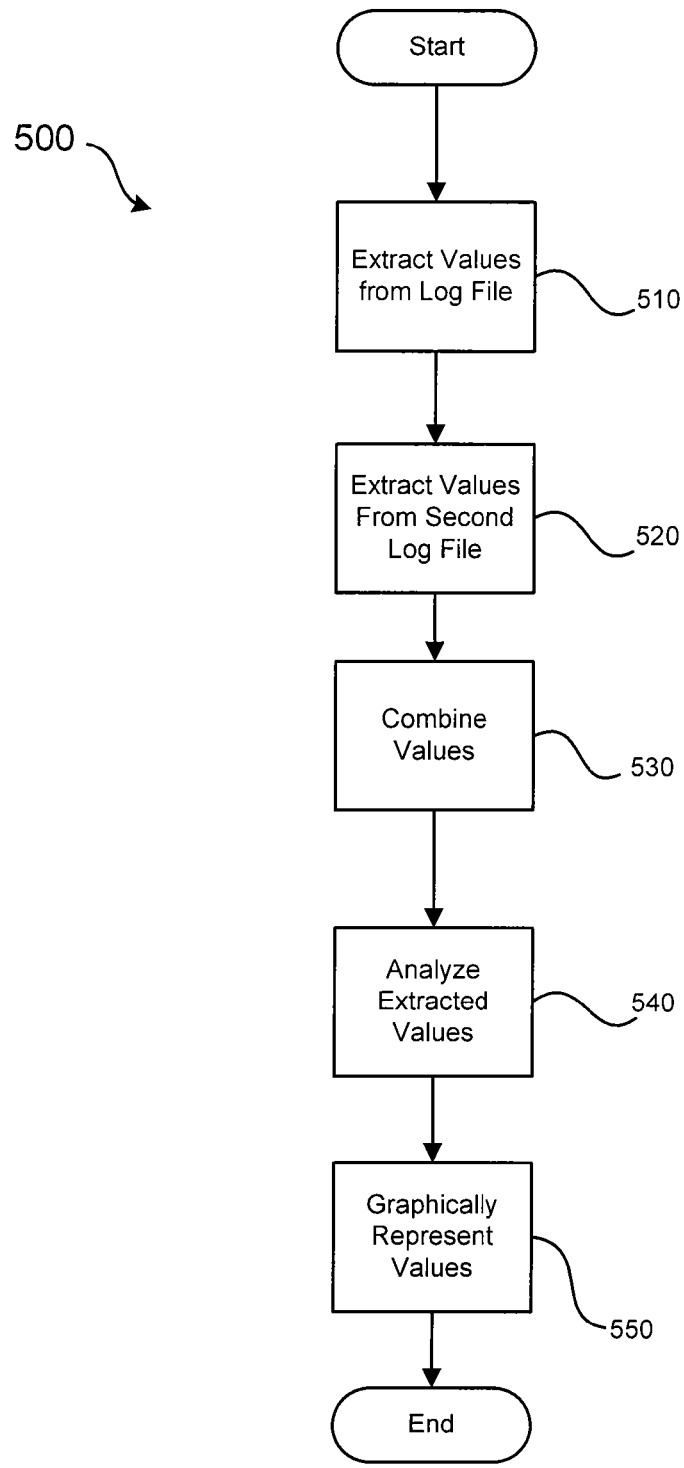
FIG. 5 is a block diagram of an example method in accordance with an example embodiment.

In one embodiment, values from multiple log files may be extracted and combined. FIG. 5 illustrates an example method 500 in accordance with an example embodiment.

At 510, data is extracted from a first log file. The data may be extracted using a grammar file as described herein. At 520, data is extracted for from a second log file. The values may be extracted from a plurality of data fields from a second log file using a second grammar file. In one embodiment, a second grammar file may not be used. Instead, the same grammar file may be used to extract values from both the first and second log files. In another example, a plurality of grammar files may be used to extract values from a single log file.

At 530, the data extracted from the first and second log files are combined. For example the extracted values from the log file may be combined with extracted values from the second log file.

At 540, the extracted, combined values are analyzed. The combined values can be analyzed using a SCXML as described herein.

At 550, the extracted, combined, analyzed data is graphically displayed. The display may be in any format. For example, telephone call log files can be displayed in a ladder format.

Figure 6:
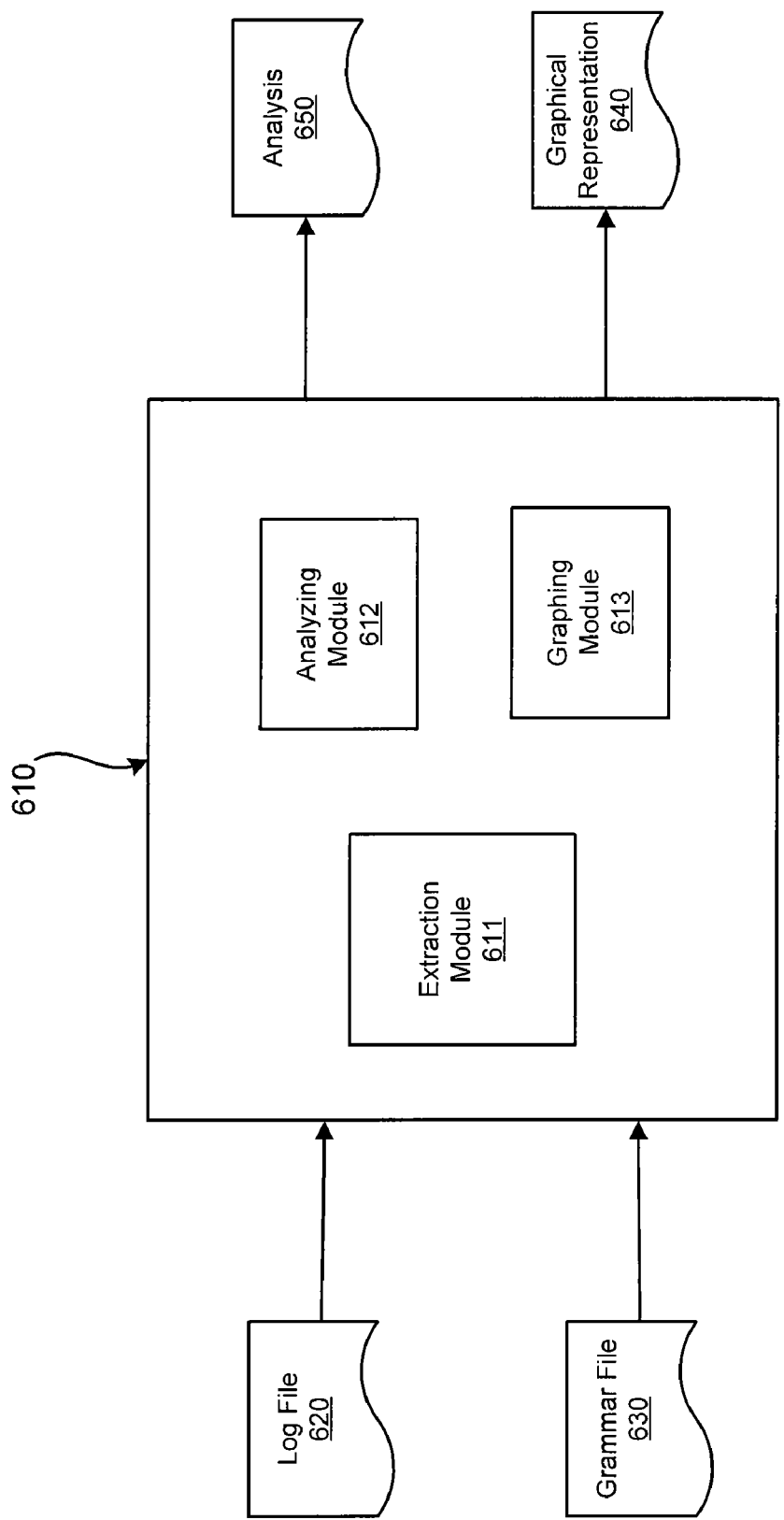
FIG. 6 is a block diagram of an example apparatus in accordance with an example embodiment.

FIG. 6 illustrates a block diagram of an example apparatus 610 in accordance with an example embodiment. Apparatus 610 includes extraction module 611. Extraction module comprises logic to extract values of a plurality of data fields from log file 620 using grammar file 630. The plurality of data fields and a procedure for extracting the values of the plurality of data fields are defined in the grammar file 630. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software. Apparatus 610 also includes analyzing module 612. Analyzing module 612 comprises logic to generate analysis 650 of the extracted values. Apparatus 610 also includes graphing module 613. Graphing module 613 comprises logic to generate graphical representation 640 of the extracted values.

In one example, analyzing module 612 may use a finite state machine (FSM) to perform the analysis. The FSM comprises a plurality of states. The FSM also comprises a transition to indicate a change of states. The FSM also comprises an event to trigger the transition. The FSM also comprises a condition to determine the occurrence of the event. In one example, an FSM may be defined in State Chart Markup Language (SCXML). An event may be defined in Event Definition Language (EDL). A condition may be defined in Java Expression Language (JEXL).

Figure 7:
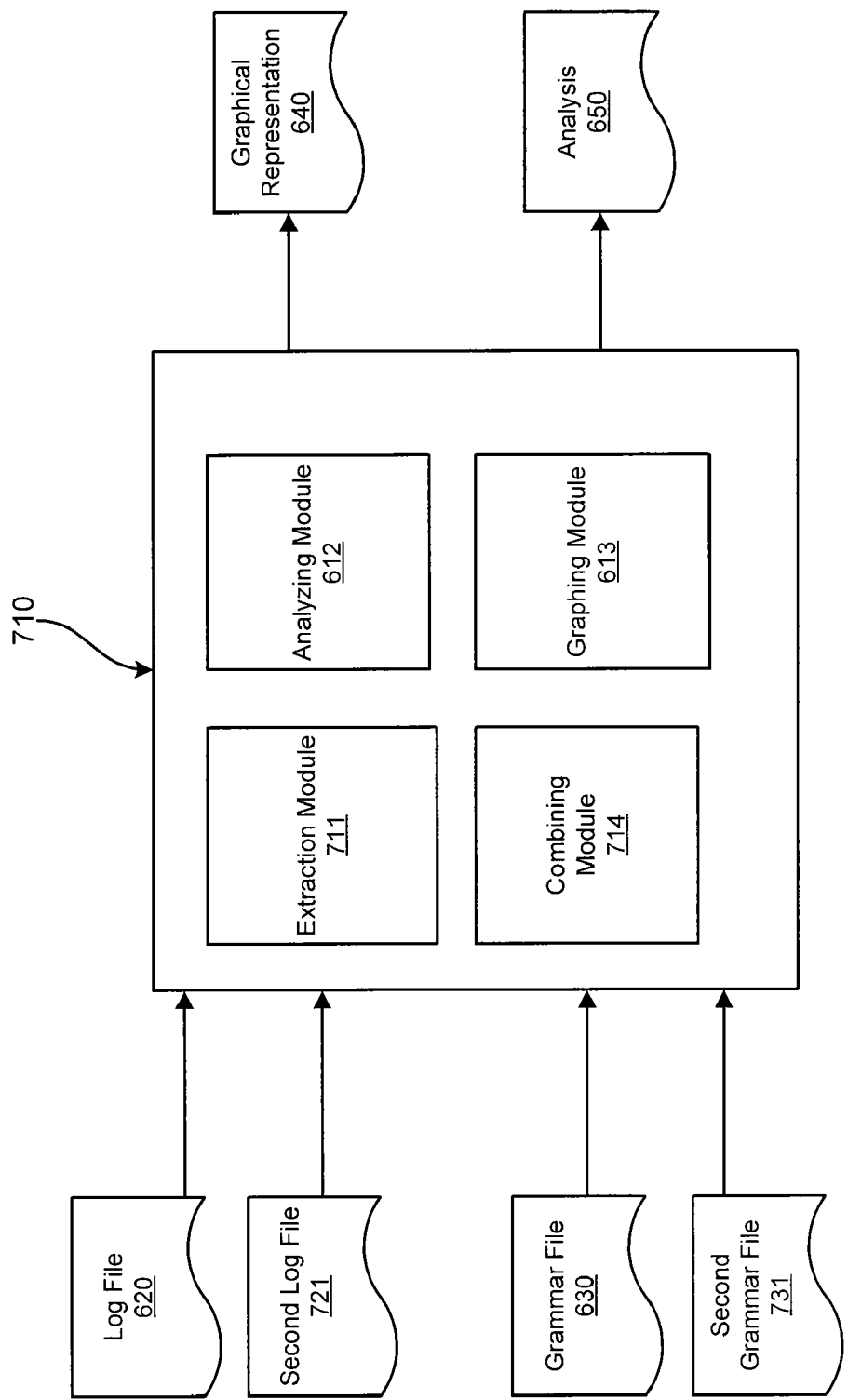
FIG. 7 is a block diagram of an example apparatus in accordance with an example embodiment.

In one embodiment, an example apparatus may include logic to extract values from multiple log files and to combine the values. FIG. 7 illustrates a block diagram of an example apparatus 710 in accordance with an example embodiment. Apparatus 710 includes extraction module 711. Extraction module 711 comprises logic to extract values of a plurality of data fields from log file 620 using grammar file 630 and from second log file 721 using second grammar file 731. Apparatus 710 includes combining module 714. Combining module 714 comprises logic to combine values extracted from log file 620 with values extracted from second log file 721. Apparatus 710 also includes analyzing module 612. Analyzing module 612 comprises logic to generate analysis 650 of the extracted values. Apparatus 710 also includes graphing module 613. Graphing module 613 comprises logic to generate graphical representation 640 of the extracted values.

Figure 8:
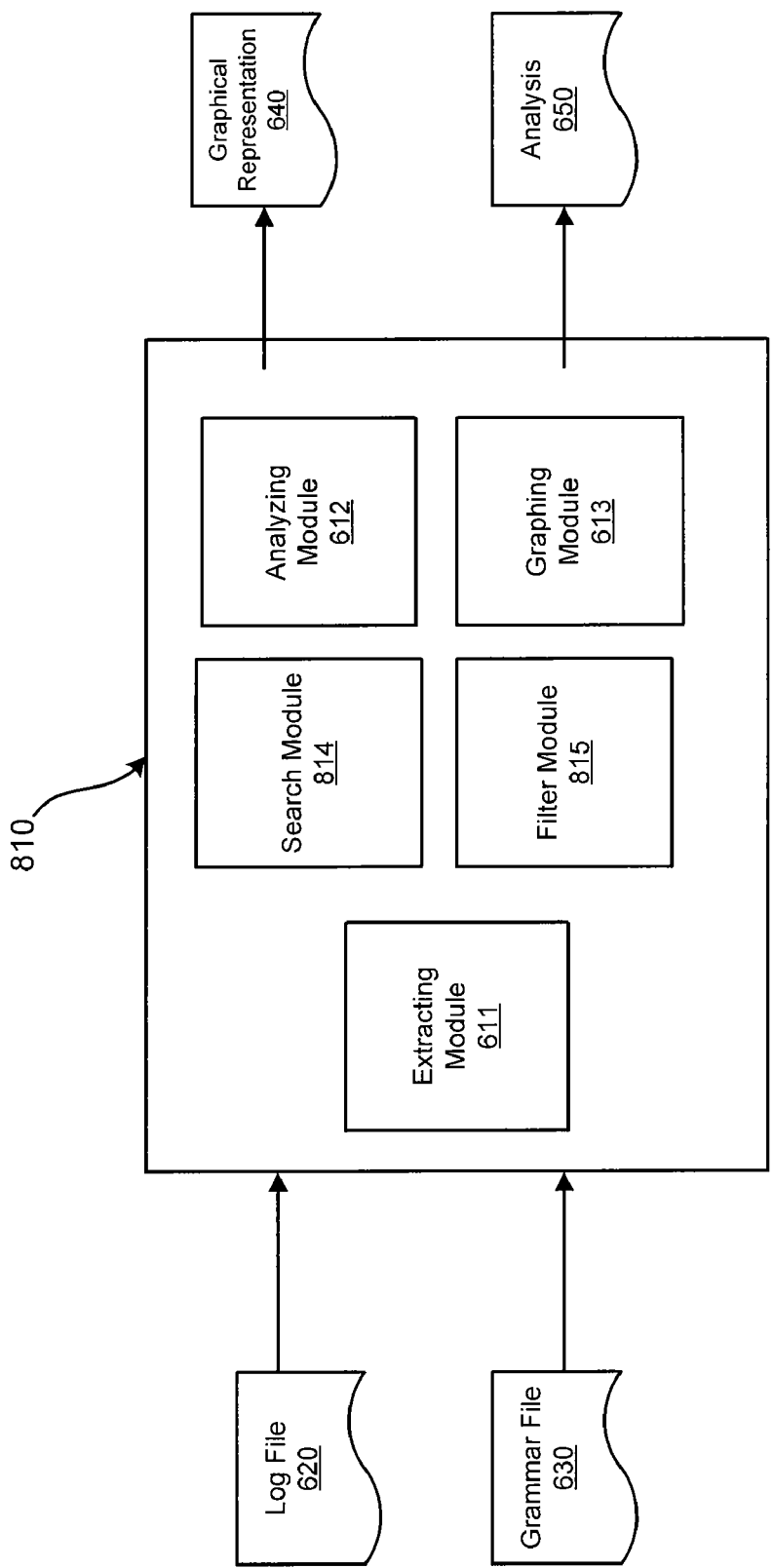
FIG. 8 is a block diagram of an example apparatus in accordance with an example embodiment.

In one embodiment, an example apparatus may include logic to search the values in a log file and to filter the extracted values from a log file. FIG. 8 illustrates a block diagram of an example apparatus 810 in accordance with an example embodiment. Apparatus 810 includes extraction module 611. Extraction module 611 comprises logic to extract values of a plurality of data fields from log file 620 using grammar file 630. Apparatus 810 also includes search module 814. Search module 814 comprises logic to search log file 620 based on a user specified search parameter. Apparatus 810 also includes filter module 815. Filter module 815 comprises logic to filter extracted values based on a user specified filter parameter. Apparatus 810 also includes analyzing module 612. Analyzing module 612 comprises logic to generate analysis 650 of the extracted values. Apparatus 810 also includes graphing module 613. Graphing module 613 comprises logic to generate graphical representation 640 of the extracted values.

In one embodiment, an example apparatus may be implemented as a call flow tool. A call flow tool may comprise logic to extract values of a plurality of data fields from a log file wherein the log file contains information corresponding to a communication between a first component and a second component. The communication may comprise a plurality of message exchanges between the first component and the second component. Values of the plurality of data fields of the log file may correspond to the plurality of message exchanges. In one example, the messages exchanged between the first component and the second component may be Session Initiation Protocol (SIP) messages. In another example, the messages exchanged between the first component and the second component may be Interactive Voice Response (IVR) messages or Intelligent Contact Management (ICM) messages.

In one example, a graphical representation generated by an example graphing module may be a ladder diagram. A ladder diagram may include a first vertical ladder member corresponding to a first component. A ladder diagram may also include a second vertical ladder member corresponding to a second component. A ladder diagram may also include a plurality of ladder rungs extending from the first vertical ladder member to the second vertical ladder member. The plurality of ladder rungs may correspond to a plurality of message exchanges between the first component and the second component.

Figure 9:
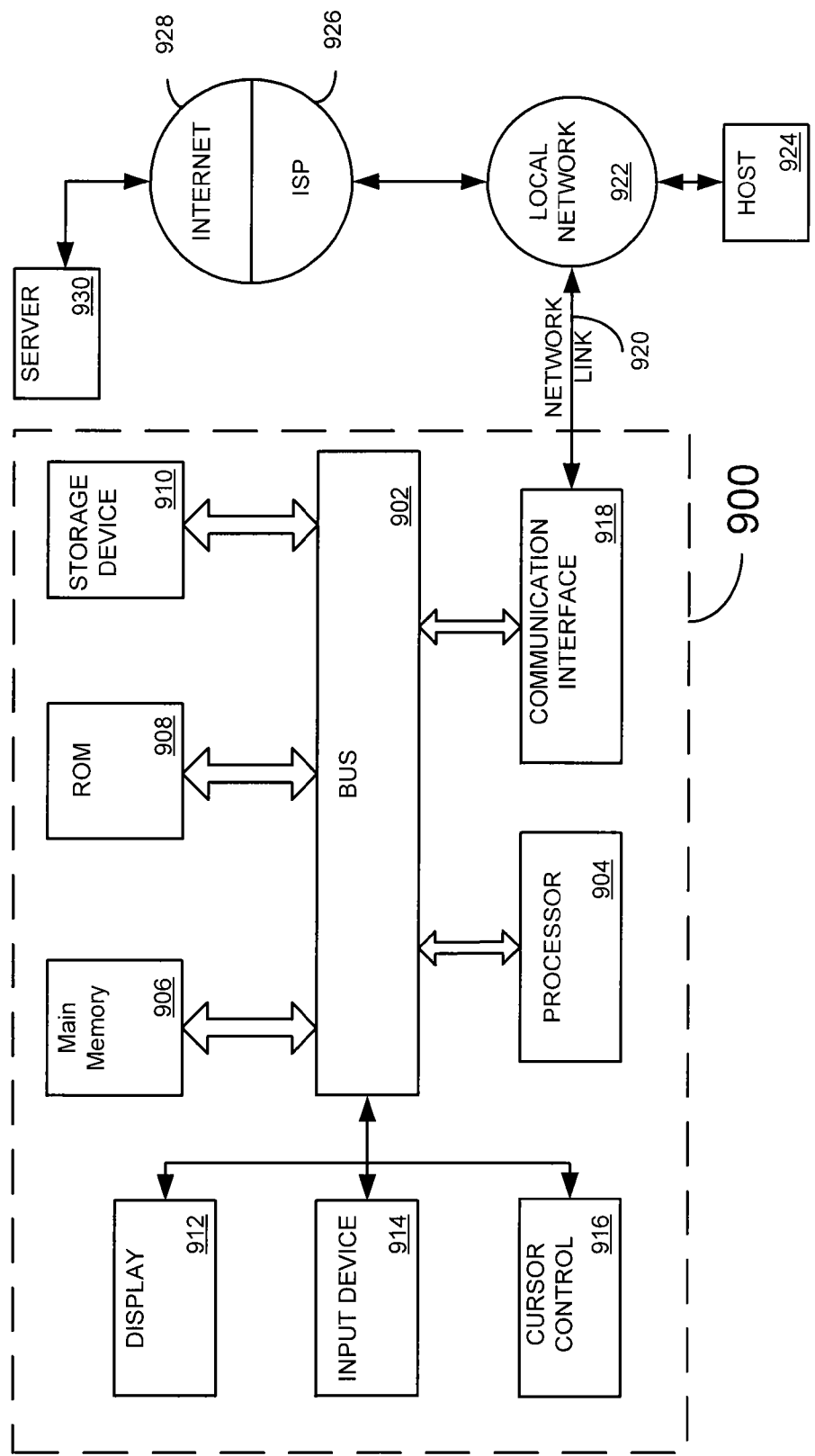
FIG. 9 is an example of a computer system for implementing an example embodiment.

FIG. 9 is a block diagram that illustrates a computer system 900 upon which an example embodiment may be implemented. Computer system 900 includes a bus 902 or other communication mechanism for communicating information and a processor 904 coupled with bus 902 for processing information. Computer system 900 also includes a main memory 906, such as random access memory (RAM) or other dynamic storage device coupled to bus 902 for storing information and instructions to be executed by processor 904. Main memory 906 also may be used for storing a temporary variable or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912 such as a cathode ray tube (CRT) or liquid crystal display (LCD), for displaying information to a computer user. An input device 914, such as a keyboard including alphanumeric and other keys is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g. x) and a second axis (e.g. y) that allows the device to specify positions in a plane.

An aspect of the example embodiment is related to the use of computer system 900 for analyzing log files. According to an example embodiment, analyzing log files is provided by computer system 900 in response to processor 904 executing one or more sequences of one or more instructions contained in main memory 906. Such instructions may be read into main memory 906 from another computer-readable medium, such as storage device 910. Execution of the sequence of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 904 for execution. Such a medium may take many forms, including but not limited to non-volatile media, volatile media, and transmission media. Non-volatile media include for example optical or magnetic disks, such as storage device 910. Volatile media include dynamic memory such as main memory 906. Transmission media include coaxial cables, copper wire and fiber optics, including the wires that comprise bus 902. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 904 for execution. For example, the instructions may initially be borne on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906 from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling computer system 900 to a network link 920 that is connected to a local network 922.

For example, communication interface 918 may be a local area network (LAN) card to provide a data communication connection to a compatible LAN. As another example, communication interface 918 may be an integrated services digital network (ISDN) card or a modem to provide a data communication connection to a corresponding type of telephone line. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet ServiceProvider (ISP) 926. ISP 926 in turn provides data communications through the worldwide packet data communication network, now commonly referred to as the "Internet" 928. Local networks 922 and Internet 928 both use electrical, electromagnetic, or optical signals that carry the digital data to and from computer system 900.

Computer system 900 can send messages and receive data, including program codes, through the network(s), network link 920, and communication interface 918. In the Internet example, a server 930 might transmit a requested code for an application program through Internet 928, ISP 926, local network 922, and communication interface 918. In accordance with an example embodiment, one such downloaded application provides for analyzing log files as described herein.

In an example embodiment, the log file analyzer described herein can be employed to implement a call flow tool (CFT). Servers and other devices servicing telephone calls generate log files detailing events corresponding to a telephone call. The events for a particular phone call may reside on a plurality of devices or components. For example, below is a very simplified log file:

Msg_trace: 1:45:00 sender=Jim receiver=Bob label=Hello
Msg_trace: 1:45:01 sender=Bob receiver=Jim label=Hello
Msg_trace: 1:45:02 sender=Jim receiver=Bob label=Bye
Msg_trace: 1:45:03 sender=Bob receiver=Jim label=Bye
. . .

The above log file illustrates an example of four generic messages sent in a conversation between "Jim" and "Bob." The following values for each message can be extracted from this log file:

Timestamp (e.g. "1:45:00");
Sender (e.g. "Jim");
Receiver (e.g. "Bob");
Label (e.g. "Hello").

An XML file can be created for extracting the data from the log file. In this example, an XML file is defined with the root element MessageType and is named "JimMsgType".
<?xml version="1.0"?>
<MessageType name="JimMsgType">
</MessageType>
Next the fields are defined:
"JimMsgType".
<?xml version="1.0"?>
<MessageType name="JimMsgType">
</MessageType>

The format of fields may also be defined. Below is an example that includes the definition of the format for the Timestamp field using the TimestampFormat tag.

"JimMsgType".
<?xml version="1.0"?>
<MessageType name="JimMsgType">
</MessageType>
Next the fields are defined:
"JimMsgType".
<?xml version="1.0"?>
<MessageType name="JimMsgType">
</RequiredFields>
<TimestampFormat>HH:mm:ss</TimestampFormat>
. . .
</MessageType>

The example log file illustrates simple case where each message spans one line. A FirstLines tag tells the parser how to recognize the first line of a message. In the below example, a <Line> tag named MyMsg is defined against which each line of the log file will be checked. A <Line> contains two tags, <Literal> and <PXML>. The PXML tag is the full expression to match. The parser will try to match the full <PXML> expression if the current line in the log file contains the specified <Literal>.

"JimMsgType".
<?xml version="1.0"?>
<MessageType name="JimMsgType">
</MessageType>
Next the fields are defined:
"JimMsgType".
<?xml version="1.0"?>
<MessageType name="JimMsgType">

```
    <Field>MSG_LABEL</Field>
    <Field>TIMESTAMP</Field>
</RequiredFields>
<TimestampFormat>HH:mm:ss</TimestampFormat>
<FirstLines>
    <Line name="myMsg">
    <Literal>Msg_Trace</Literal>
    <PXML>Msg_Trace: {% TIMESTAMP %} sender={%
        SENDER %} receiver={% RECEIVER %} label={%
        MSG_LABEL %}</PXML>
    </Line>
...
</MessageType>
```

In the above example, since each line of the log file contains the Literal "Msg_Trace", it is used as the value for the <Literal> tag. The PXML tag instructs the parser how to extract information from the line. The <PXML> tag is essentially a regular expression. The parser tries to match each part of the <PXML> tag to the current line in the log file. The <PXML> contains two types of text. Any text not of the format {% TEXT %} must match the current line of the log file exactly. Anything formatted {% TEXT %} has special meaning. For example, {% TIMESTAMP %}, {% SENDER %}, etc. refer to the <FIELD> tags defined earlier. The parser attempts to extract values for these parameters from the specified position in the log file. In particular embodiments, certain keywords such as {% IGNORE %} and {% WHITESPACE %} are reserved and have special meaning. In particular embodiments the parser is whitespace and case sensitive.

Figures 10, 11:
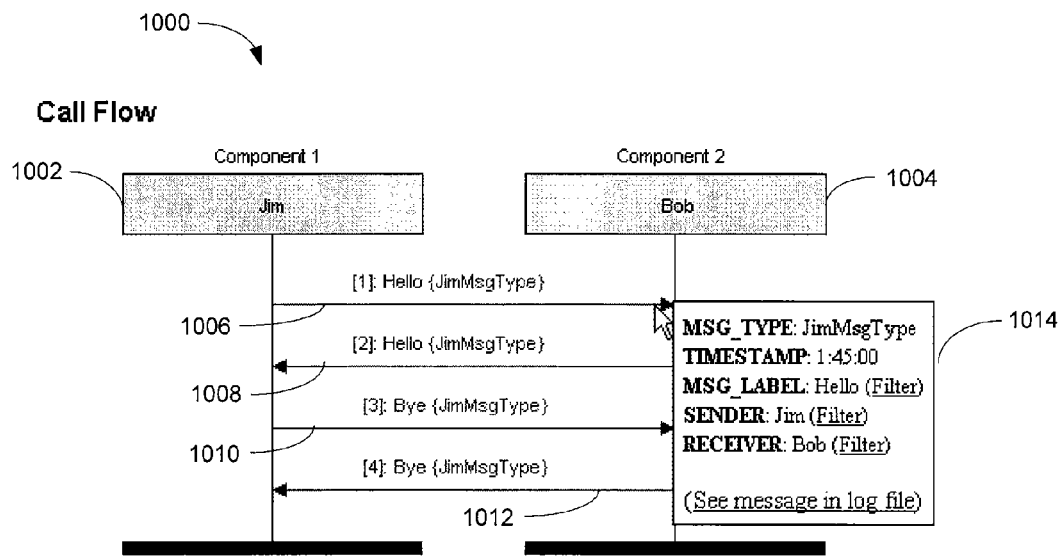
FIG. 10 illustrates an example output for a call flow tool analyzing an example log file.
FIG. 11 illustrates an example of an input interface for obtaining search parameters.

The above described XML file can then be employed to parse data from the simple log file. In the illustrated example, no results would be returned. In this situation a detailed parsing of the log file can be obtained. An example of a parsing of the above XML file follows:

Line 1: Msg_trace: 1:45:00 sender=Jim receiver=Bob label=Hello
Status: No Literal matches from FirstLines of any template.
Line 2: Msg_trace: 1:45:01 sender=Bob receiver=Jim label=Hello
Status: No Literal matches from FirstLines of any template.
Line 3: Msg_trace: 1:45:02 sender=Jim receiver=Bob label=Bye
Status: No Literal matches from FirstLines of any template
Line 4: Msg_trace: 1:45:03 sender=Bob receiver=Jim label=Bye
Status: No Literal matches from FirstLines of any template From the foregoing, the Literal Tag was not found on any line of the log file. This is because the parser is case sensitive. The literal in the XML file, Msg_Trace, does not match Msg_trace that is found in the log file. By changing the literal to <Literal>Msg_trace:</literal> in the above XML file, the output 1000 illustrated in FIG. 10 is obtained.

Output 1000 illustrates two components for the call flow, the first component (Component 1 "Jim") 1002 is a first endpoint of the call. The second component (Component 2 "Bob") 1004 is the second endpoint of the call. The first line in the log file is illustrated by line 1006, labeled "Hello" from component 1002 to component 1004. The second line in the log file is represented by line 1008 labeled "Hello" from component 1004 to component 1002. The third line of the log file is represented by line 1010 "labeled Bye" from component 1002 to component 1004. The fourth line of the log file is represented by line 1012 labeled "Bye" from component 1004 to component 1002.

In an example embodiment, such as an HTML (Hyper Text Markup Language) compatible environment, mousing over or selecting a line will cause a box to appear listing the defined fields. In the illustrated example, line 1006 is selected and box 1014 displays the values for log entry. In the example the MSG_TYPE=JimMsgType, TIMESTAMP=1:45:00, MSG_LABEL=Hello, SENDER=Jim, and RECEIVER=Bob. A hyper link associated with MSG_LABEL enables a user to filter the results based on the MSG_LABEL field. Similarly, hyper links associated with SENDER and RECEIVER enable a user to filter results on these fields as well. A hyper link at the bottom of box 1014 enables a user to view the actual message in the log file.

Any field may be searched setting a search="true" in the XML file. For example, the below example XML file will allow the SENDER, RECEIVER and MSG_LABEL fields to be searched, but not the TIMESTAMP field.

"JimMsgType".

```
<?xml version="1.0"?>
<MessageType name="JimMsgType">
</MessageType>
```

Next the fields are defined:

"JimMsgType".

```
<?xml version="1.0"?>
<MessageType name="JimMsgType">
    <Field search="true">SENDER</Field>
    <Field search="true">RECEIVER</Field>
    <Field search="true">MSG_LABEL</Field>
    <Field TIMESTAMP</Field>
</RequiredFields>
<TimestampFormat>HH:mm:ss</TimestampFormat>
<FirstLines>
    <Line name="myMsg">
    <Literal>Msg_Trace</Literal>
    <PXML>Msg_Trace: {% TIMESTAMP %} sender={%
        SENDER %} receiver={% RECEIVER %} label={%
        MSG_LABEL %}</PXML>
    </Line>
...
</MessageType>
```

Figure 12:
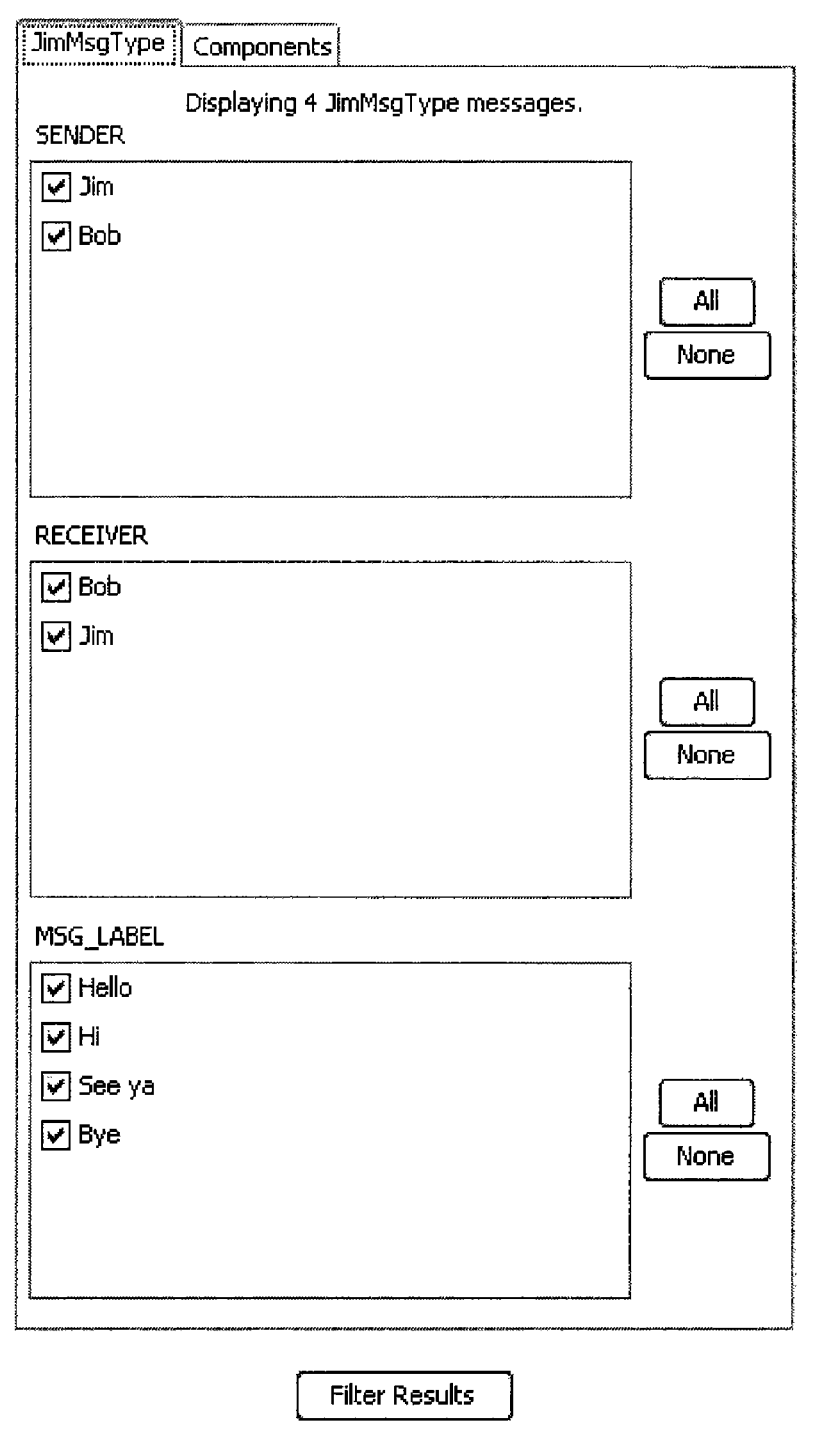

FIG. 11 illustrates an example of a data entry screen enabling a user to search for the searchable fields specified in the above XML code. FIG. 12 illustrates an example screen enabling a user to filter results of a log file analysis.

The XML file can also be modified so that messages can be grouped/color coded. For example, messages grouped by a field labeled as a "key" are grouped or color coded based on the value. For example, the below XML code contains an entry in the msg_label field that will cause messages to be grouped by label.

"JimMsgType".

```
<?xml version="1.0"?>
<MessageType name="JimMsgType">
```

```
</MessageType>
```
Next the fields are defined:

"JimMsgType".

```
<?xml version="1.0"?>
<MessageType name="JimMsgType">
    <Field search="true">SENDER</Field>
    <Field search="true>RECEIVER</Field>
    <Field search="true" key="true">MSG_LABEL</Field>
    <Field TIMESTAMP</Field>

</RequiredFields>
<TimestampFormat>HH:mm:ss</TimestampFormat>
<FirstLines>
    <Line name="myMsg">
    <Literal>Msg_Trace</Literal>
    <PXML>Msg_Trace: {% TIMESTAMP %} sender=
       {% SENDER %} receiver={% RECEIVER %} label=
       {% MSG_LABEL %}</PXML>
    </Line>
...
</MessageType>
```

Using the above example, lines 1006, 1008 which are "Hello" messages will be grouped together and colored differently than lines 1010, 1012 which are "Bye" messages in FIG. 10.

An example will now be provided that illustrates a very simple state machine that can be employed to determine if a call was successful. In this example, a "call" is a Generic-Message object with the same CALL_ID field, a field that is added to the previous example. A successful call is defined as a call which the first message is a "Hello" and the last message is a "Bye." The below log file will be used for this example:

...

Msg_trace: 1:45:00 callid=1111 sender=Jim receiver=Bob label=Hello

Msg_trace: 1:45:01 callid=1111 sender=Bob receiver=Jim label=Hello

Msg_trace: 1:45:02 callid=1111 sender=Jim receiver=Bob label=Bye

Msg_trace: 1:45:03 callid=1111 sender=Bob receiver=Jim label=Bye

...

Msg_trace: 1:45:00 callid=3121 sender=Bob receiver=Steve label=Hello

...

Msg_trace: 1:45:01 callid=3121 sender=Steve receiver=Bob label=Hello

Msg_trace: 1:45:02 callid=3121 sender=Bob receiver=Steve label=Bye

Msg_trace: 1:45:03 callid=3121 sender=Steve receiver=Bob label=Hello

...

Figure 13:
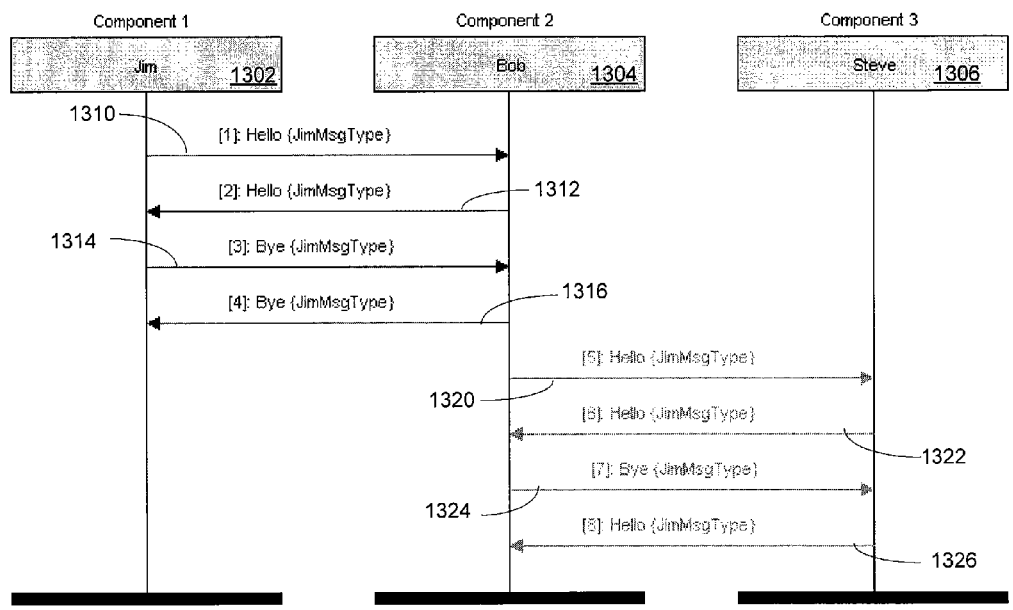
FIG. 13 illustrates an example output from a call flow tool analyzing multiple calls.

In the above example log file, " . . . " is used to illustrate that additional log entries may occur before, after, or even during the call. Using the XML filed illustrated below the output illustrated in FIG. 13 is obtained.

```
<?xml version="1.0"?>
<MessageType name="JimMsgType">
</MessageType>
```
Next the fields are defined:

"JimMsgType".

```
<?xml version="1.0"?>
<MessageType name="JimMsgType">
    <Field search="true">SENDER</Field>
    <Field search="true >RECEIVER</Field>
    <Field search="true"">MSG_LABEL</Field>
    <Field search="true" key="true>CALL_ID</Field>
    <Field>TIMESTAMP</Field>
</RequiredFields>
<TimestampFormat>HH:mm:ss</TimestampFormat>
<FirstLines>
    <Line name="myMsg">
    <Literal>Msg_Trace</Literal>
    <PXML>Msg_Trace: {% TIMESTAMP %} sender=
       {% SENDER %} receiver={% RECEIVER %} label=
       {% MSG_LABEL %}</PXML>
    </Line>
...
</MessageType>
```

The above XML file has the CALL_ID field listed as the key field; therefore, the messages are grouped by the CALL_ID field (the groups may also be displayed in different colors). In this example, there are two calls, one from Jim (Component 1) 1302 to Bob (Component 2) 1304, and one from Bob (Component 2) 1304 to Steve (Component 3) 1306. Log entries 1310, 1312, 1314 and 1316 are for the first call. Log entries 1320, 1322, 1324, and 1326 are for the second call. The messages are displayed grouped by CALL_ID in the order they appeared in the log file.

The log entry 1310 indicates a "Hello" message was sent from Jim (Component 1) 1302 to Bob (Component 2) 1304. Log entry 1312 indicates a subsequent "Hello" message was sent from Bob (Component 2) 1304 to Jim (Component 1) 1302. Log entry 1314 indicates a subsequent "Bye" message was sent from Jim (Component 1) 1302 to Bob 1304. Log entry 1316 indicates a subsequent "Bye" message was sent from Bob (Component 2) 1304 to Jim (Component 1) 1302.

The log entry 1320 indicates a "Hello" message was sent from Bob (Component 2) 1304 to Steve (Component 3) 1306. Log entry 1322 indicates a subsequent "Hello" message was sent from Steve (Component 3) 1306 to Bob (Component 2) 1304. Log entry 1324 indicates a subsequent "Bye" message was sent from Bob (Component 2) 1304 to Steve (Component 3) 1306. Log entry 1326 indicates a subsequent "Hello" message was sent from Steve (Component 3) 1306 to Bob (Component 2) 1304.

Figure 14:
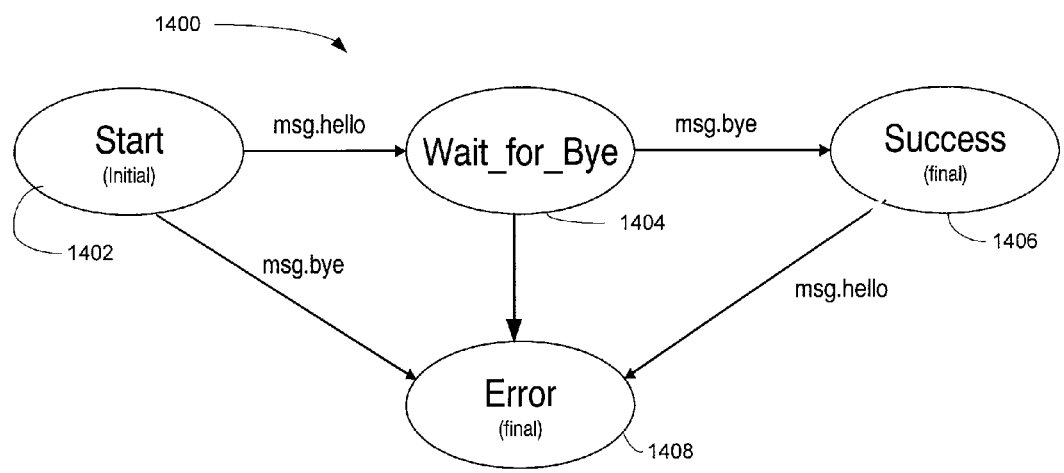
FIG. 14 illustrates an example of a state machine for analyzing an example call flow.

A state machine can be employed to analyze the call flow from the above log file illustrated in FIG. 13. FIG. 14 illustrates an example of a state machine 1400 for analyzing an example call flow. In the state machine for this example, there are two types of messages: Hello and Bye. An event is defined for each message type, one called msg.hello and he other msg.bye. State 1402 is the initial start state. When a hello message (msg.hello) is found, the state machine transitions to WAIT_FOR_BYE at 1404. If a bye message (msg.bye) is subsequently encountered, then the call was a success as indicated by state 1406. If a hello message (msg.hello) is encountered after a bye message (msg.bye), then the state machine transitions to an error state as indicated at 1408. Below is an example SCXML state machine using the W3C specification (version 1.0, October 1994):

```
<?xml version="1.0" ?>
<scxml xmlns="http://www.w3.org/2005/07/scxml" version="1.0" initialstate="Start">
<state id="Start">
   <transition event="msg.hello" target="Wait_for_Bye"/>
   <transition event="msg.bye" target="Error"/>
</state>
<state id="Wait_for_Bye">
   <transition event="msg.bye" target="Success"/>
</state>
<state id="Success" final="true">
   <transition event="msg.hello" target="Error"/>
</state>
<state id="Error" final="true"/>
</scxml>
```

An <automata> tag is added to the bottom of the XML file to tell the log file analyzer, the CFT in this example, to pass GenericMessage objects for the JimMsgType through the above state machine. In this example, the above SCXML state machine is saved in a file ".\conf\Automata\JimMsgType_FS.xml." The groupby attribute instructs the CFT to group messages by the given field and pass each group through the state machine separately. Below is an example of the XML file with the <automata> tag:

```
<?xml version="1.0"?>
<MessageType name="JimMsgType">
</MessageType>
```

Next the fields are defined:

"JimMsgType".

```
<?xml version="1.0"?>
<MessageType name="JimMsgType">
    <Field search="true">SENDER</Field>
    <Field search="true">RECEIVER</Field>
    <Field search="true"">MSG_LABEL</Field>
    <Field search="true" key="true>CALL_ID</Field>
    <Field>TIMESTAMP</Field>
s</RequiredFields>
<TimestampFormat>HH:mm:ss</TimestampFormat>
<FirstLines>
   <Line name="myMsg">
      <Literal>Msg_Trace</Literal>
      <PXML>Msg_Trace: {% TIMESTAMP %} sender={% SENDER %} receiver={% RECEIVER %} label={% MSG_LABEL %}</PXML>
   </Line>
...
<Automata name="jimFSM" groupby="CALL_ID">
   <File>.\conf\Automata\JimMsgType_FSM.xml</File>
   <Event name="msg.hello">
      <Condition>{% MSG_LABEL %} eq "Hello"</Condition>
   </Event>
   <Event name="msg.bye">
      <Condition>{% MSG_LABEL %} eq "Hello"</Condition>
   </Event>
</Automata>
</MessageType>
```

In the above example, the <Event> tag is used to specify how to convert GenericMessage objects into Events since state machine transitions are based on events and not on GenericMessage objects. The above example uses Even Description Language ("EDL")(see "EDL: A Basis for Distributed System Debugging Tools", P.C. Bates et al, in Proc Hawaii Intl Conf on Sys Sci, January 1982, pp. 86-93) to specify how to convert a GenericMessage into an Event.

In the above example, the conditions are written in the Java Expression Language (JEXL) defined in the JavaServer Pages Standard Tag Library version 1.1 (JSTL) and JavaServer Pages version 2.0 (JSP). The defined conditions check if the labels equals "Hello" or "Bye".

Figure 15:
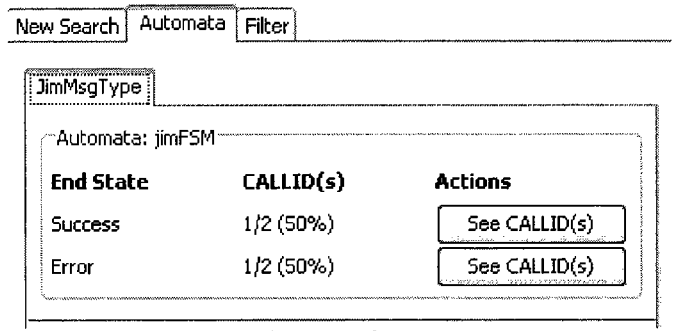
FIG. 15 illustrates an example output from the state machine after analyzing the example call flow.
Figure 16:
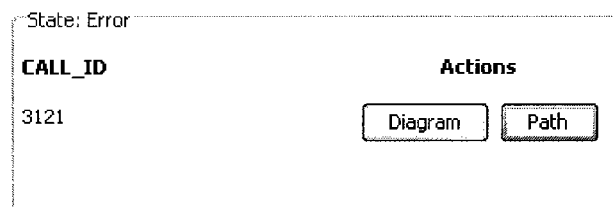
FIG. 16 illustrates an example state error output from the state machine after analyzing the example call flow.
Figure 17:
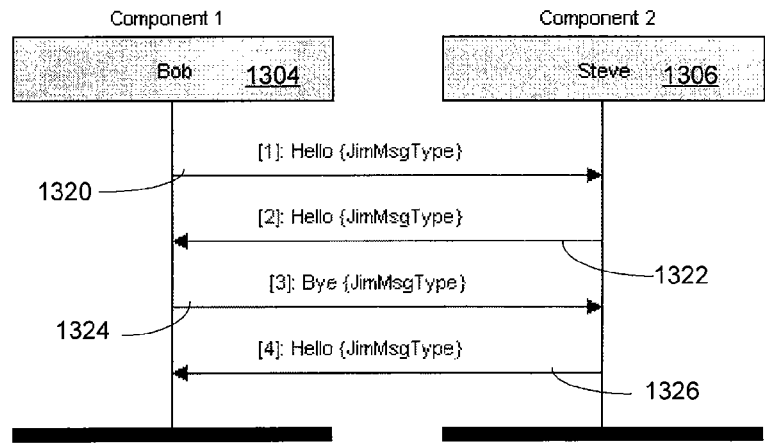
FIG. 17 illustrates an example diagram of a call flow with an error output from the state machine after analyzing the example call flow.
Figure 18:
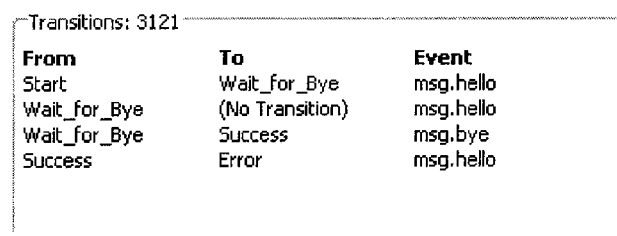
FIG. 18 illustrates an example of a path where an error occurred output from the state machine after analyzing the example call flow.

FIG. 15 illustrates an example output from the above state machine after analyzing the example call flow. As can be expected from the above log file, there was one successful call and one error. FIG. 16 illustrates an example state error output from the state machine after analyzing the example call flow. FIG. 16 can be displayed by selecting the See CALLID(s) from the state machine output of FIG. 15 The display in FIG. 16 allows a user to obtain a diagram or the path of the call that produced the error. FIG. 17 illustrates an example diagram of a call flow with an error output from the state machine after analyzing the example call flow. The diagram of FIG. 17 is similar to the diagram of FIG. 13, except this diagram just shows the calls that had an error. FIG. 18 illustrates an example of the path through the state machine enabling a user to see how the state machine arrived at the error state.

From the foregoing, the data from almost any log file can be extracted by changing the definitions in the XML file without having to change any software code. Moreover, multiple XML files can be created for acquiring data from multiple log file formats.

Described above are example embodiments. It is, of course, not possible to describe every conceivable combination of components or methodologies for purposes of describing the example embodiments, but one of ordinary skill in the art will recognize that many further combinations and permutations of the example embodiments are possible. Accordingly, it is intended to embrace all such alterations, modifications and variations that fall within the spirit and scope of any claims filed in applications claiming priority hereto interpreted in accordance with the breadth to which they are fairly, legally and equitably entitled.

The invention claimed is:

1. A method comprising:
acquiring a grammar file, the grammar file comprising data for extracting values from a log file;
extracting values from a plurality of data fields from the log file using the grammar file;
analyzing the extracted values with a state machine; and
graphically representing the extracted values;
wherein the log file contains information corresponding to a communication between a first component and a second component;
wherein the communication comprises a plurality of message exchanges between the first component and the second component; and
wherein the values of the plurality of data fields of the log file correspond to the plurality of message exchanges.

2. The method of claim 1, wherein the grammar file is an Extensible Markup Language (XML) template.

3. The method of claim 2, wherein the plurality of data fields and a procedure for extracting the values from the plurality of the data fields are defined in a Log Description Language (LDL).

4. The method of claim 1 wherein:
the grammar file identifies a data field as capable of being searched;
the grammar file defines a procedure for extracting a value from a data field identified as capable of being searched; and
the values extracted from the plurality of data fields are based on a specified search parameter.

5. The method of claim 4 comprising filtering the values extracted from the plurality of data fields based on a user specified filter parameter.

6. The method of claim 1, wherein the extracted values are analyzed using the state machine defined in State Chart Extensible Markup Language (SCXML), the finite state machine comprising:
a plurality of states;
a transition to indicate a change from one of the plurality of states to a second of the plurality of states;
an event to trigger the transition; and
a condition to determine occurrence of the event.

7. The method of claim 6, wherein analyzing the extracted data using the finite state machine comprises:
inputting the extracted values to the finite state machine;
obtaining a result from the finite state machine wherein the result comprises:
an initial state;
a final state; and
an event triggering a transition between the initial state and the final state; and
outputting the result.

8. The method of claim 1, wherein the graphical representation is a ladder diagram comprising:
a first vertical ladder member corresponding to the first component;
a second vertical ladder member corresponding to the second component; and
a plurality of ladder rungs extending between the first vertical ladder member to the second vertical ladder member, wherein the plurality of ladder rungs correspond to the plurality of message exchanges between the first component and the second component.

9. The method of claim 8, wherein:
the plurality of ladder rungs are represented in a plurality of colors corresponding to a plurality of message groups; and
the plurality of ladder rungs are represented in a plurality of styles corresponding to a plurality of message types.

10. The method of claim 1 further comprising:
extracting the values of a plurality of data fields from a second log file using a second grammar file; and
combining the values extracted from the second log file with the values extracted from the log file.

11. An apparatus comprising:
an extraction module to extract values from a plurality of data fields from a log file using a grammar file, wherein the plurality of data fields and a procedure for extracting the values of the plurality of data fields are defined in the grammar file;
an analyzing module to generate an analysis of the extracted values with a state machine; and
a graphing module to generate a graphical representation of the extracted values;
wherein the log file contains information corresponding to a communication between a first component and a second component;
wherein the communication comprises a plurality of message exchanges between the first component and the second component; and
wherein the values of the plurality of data fields of the log file correspond to the plurality of message exchanges.

12. The apparatus of claim 11, wherein the analyzing module uses a finite state machine, the finite state machine comprising:
a plurality of states defined in State Chart Extensible Markup Language (SCXML);
a transition defined in SCXML to indicate a change of states;
an event defined in Event Definition Language (EDL) to trigger the transition; and
a condition defined in Java Expression Language (JEXL) to determine the occurrence of the event.

13. The apparatus of claim 11, further comprising:
an extraction module to extract values of a plurality of data fields from a second log file using a second grammar file, wherein the plurality of data fields and a procedure for extracting the values of the plurality of data fields are defined in the second grammar file; and
a combining module to combine the extracted data from the log file with extracted data from a second log file.

14. The apparatus of claim 11, further comprising a search module to search the log file based on a user specified search parameter.

15. The apparatus of claim 11, further comprising a filter module to filter the extracted values based on a user specified filter parameter.

16. The apparatus of claim 11, wherein the message exchanges between the first component and the second component are Session Initiation Protocol (SIP) messages.

17. The apparatus of claim 11, wherein the graphical representation is a ladder diagram comprising:
a first vertical ladder member corresponding to a first component;
a second vertical ladder member corresponding to a second component; and
a plurality of ladder rungs extending between the first vertical ladder member to the second vertical ladder member, wherein the plurality of ladder rungs correspond to a plurality of message exchanges between the first component and the second component.

18. Logic encoded in one or more tangible, non-transitory computer readable media for execution and when executed operable to:

extract the values of a plurality of data fields from a log file using a grammar file, wherein the plurality of data fields and a procedure for extracting the values of the plurality of data fields are defined in the grammar file;

analyze the extracted values using a state machine; and generate a graphical representation of the extracted values wherein the log file contains information corresponding to a communication between a first component and a second component;

wherein the communication comprises a plurality of message exchanges between the first component and the second component; and wherein the values of the plurality of data fields of the log file correspond to the plurality of message exchanges.

\* \* \* \* \*